Patented Nov. 17, 1936

2,060,845

UNITED STATES PATENT OFFICE 2,060,845

N-ETHYL, N-ETHYLOL CRESIDINE AND PROCESS OF PRODUCING SAME

Alfred William Baldwin, Blackley, Reginald William Everatt, Heysham, and Arthur Howard Knight, Blackley, England, assignors to Imperial Chemical Industries Limited, a corporation of Great Britain No Drawing. Application May 14, 1934, Serial No. 725,650. In Great Britain May 17, 1933

5 Claims. (Cl. 260—128)

The present invention relates to the manufacture of new dyestuff intermediates.

According to the invention we manufacture new dyestuff intermediates, by treating an alkoxymonoalkyl-aminotoluene, in which the position para to the alkylamino group is unsubstituted, with aqueous ethylene chlorohydrin in the presence of a mild alkali, thus obtaining the N-β-hydroxyethyl derivatives.

The new dyestuff intermediates may be used in the manufacture of monazo dyes by coupling them with a diazotized 2,4-dinitroaniline devoid of sulpho and carboxy groups. Using as N-β-hydroxyethyl derivatives, the N-alkyl-β-hydroxyethyl-m-amino-p-cresol alkyl ethers there are obtained dyestuffs having excellent affinity for acetate artificial silk and the like, which is dyed violet shades having very good fastness properties. Suitable first components are 2,4-dinitro-2-anisidine, 3,5-dinitro-2-toluidine and 6-chloro-2,4-dinitroaniline.

The invention is illustrated but not limited by the following example in which the parts are by weight.

Example 46 parts of N-ethylcresidine, made as described below, 112 parts of 30% aqueous ethylene chlorohydrin, 21 parts of calcium carbonate, and 2 parts of bentonite are stirred and boiled under a reflux condenser for 70 hours. The mixture is then filtered and the oily layer in the filtrate separated and distilled under reduced pressure. The product, N-ethyl-β-hydroxyethylcresidine, is obtained as a very pale yellow oil, B. P. 146–256° C./1 mm.; it forms a picrate which crystallizes from methyl alcohol in yellow prismatic needles, M. P. 147.5° C.

N-ethylcresidine (m-ethylamino-p-cresol methyl ether) is prepared as follows:

144 parts of cresidine (m-amino-p-cresol methyl ether) and 65 parts of ethyl chloride are heated in an enamelled autoclave to 135° in 14 hours and held at 135–140° C. for 12 hours. The charge is cooled and removed with the aid of hot water and the resulting solution neutralized with caustic soda.

The crude oil is separated and contains about 64% of the secondary base. This oil is stirred with ice and hydrochloric acid and treated with sodium nitrite. The oily nitrosamine so obtained is run off, washed, and reduced with iron and hydrochloric acid at 90° C. The ethylamino compound is expelled with steam after making alkaline and the ethylcresidine separated from the distillate. It is purified by vacuum distillation, the boiling point at 11 mm. being 124–125° C. It is a nearly colorless oil which rapidly turns brown in air.

N-ethyl-β-hydroxyethylcresidine may be used in the manufacture of an azo dye as follows:

The solution obtained by dissolving 183 parts of 2,4-dinitroaniline and 69 parts of sodium nitrite in 1480 parts of 100% sulphuric acid is poured on to 5000 parts of a mixture of ice and water, and the resulting solution of the diazo compound, after filtration, is added slowly to 209 parts of N-ethyl-β-hydroxyethylcresidine in 370 parts of 10% hydrochloric acid and 4000 parts of water at 10° C. Simultaneously with the addition of the diazo solution a solution of approximately 1160 parts of caustic soda in 3000 parts of water is also added to facilitate coupling by reducing the mineral acidity of the medium.

When all the diazo solution has been added the dyestuff suspension is made faintly alkaline and the dyestuff filtered off, washed thoroughly with water, and preserved as a paste or dried in any suitable way. It dyes cellulose acetate in clear bluish-violet shades.

We claim:

1. The compound

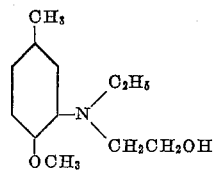

2. The method of making a dyestuff intermediate which comprises reacting cresidine with ethyl chloride at 135°–140° C. in confinement, neutralizing, treating the oily product with an acid and sodium nitrite, in the cold, reducing the nitrosamine with iron and acid to ethylamino cresidine, and reacting the N-ethyl-cresidine with ethylene chlorhydrin, in the presence of a mild base and bentonite under reflux.

3. The method of making a dyestuff intermediate which comprises reacting cresidine with ethyl chloride, treating the product with sodium nitrite, reducing the nitrosamine to ethylamino cresidine, and reacting the N-ethylcresidine with ethylene chlorhydrin.

4. In the manufacture of a dyestuff intermediate, the step which comprises reacting cresidine with ethyl chloride, reacting the product with sodium nitrite, and reducing the second product with iron and acid.

5. In the manufacture of a dyestuff intermediate the step which comprises reacting ethylamino cresidine with ethylene chlorhydrin in the presence of a mild base.

ALFRED WILLIAM BALDWIN.
REGINALD WILLIAM EVERATT.
ARTHUR HOWARD KNIGHT.